United States Patent [19]

Ikeda

[11] Patent Number: 5,384,581
[45] Date of Patent: Jan. 24, 1995

[54] IMAGE PROCESSING APPARATUS

[75] Inventor: Ikumasa Ikeda, Kawasaki, Japan

[73] Assignee: Canon Kabushiki Kaisha, Tokyo, Japan

[21] Appl. No.: 65,689

[22] Filed: May 25, 1993

Related U.S. Application Data

[63] Continuation of Ser. No. 653,241, Feb. 11, 1991, abandoned.

Foreign Application Priority Data

Feb. 15, 1990 [JP] Japan ................. 2-34805

[51] Int. Cl.$^6$ ................. G09G 5/04; H04N 9/64
[52] U.S. Cl. ................. 345/186; 348/717
[58] Field of Search ................. 345/152, 186; 340/701, 340/703, 799, 750; 358/13, 21 R; 348/716, 717

[56] References Cited

U.S. PATENT DOCUMENTS

| | | | |
|---|---|---|---|
| 4,206,457 | 6/1980 | Weisbecker et al. | 340/799 |
| 4,628,467 | 12/1986 | Nishi et al. | 340/799 |
| 4,689,660 | 8/1987 | Kashigi | 358/21 R |
| 4,772,938 | 9/1988 | Sasson | 358/21 R |
| 4,910,505 | 3/1990 | Beaver et al. | 340/750 |

*Primary Examiner*—Jeffery Brier
*Attorney, Agent, or Firm*—Fitzpatrick, Cella, Harper & Scinto

[57] ABSTRACT

There is disclosed a control circuit of a memory device of a random access type for storing first data and second data whose reading/writing cycle time is longer than that of the first data, including: a memory circuit for reading/writing a predetermined number of first data into/from each memory block which is obtained by dividing the memory device into at least two or more memory blocks, for reading/writing the second data into/from the other memory blocks, and for supplying address signals for the reading/writing cycle period of time of the second data; and a memory switching circuit for switching and using the memory blocks in order to read/write the first and second data, so that the memory device can be accessed at a high speed by using a small capacity.

20 Claims, 4 Drawing Sheets

(1) 
(2) 
(3) 
○ : Y
□ : R-Y
△ : B-Y
X : QUIESCENT PERIOD
F I G. 5

IMAGE PROCESSING APPARATUS

This application is a continuation, of application Ser. No. 07/653,241 filed Feb. 11, 1991, which is now abandoned.

BACKGROUND OF THE INVENTION

1. Field of the Invention

The present invention relates to an image processing apparatus and, more particularly, to an apparatus for processing an image signal by using a memory.

2. Related Background Art

Hitherto, in the case of storing a video signal into a memory device, in addition to a method of storing the video signal in an RGB format, there is a method of storing the video signal in a luminance and color difference format because it is sufficient to use a small memory capacity. As memory devices, there is known a construction such as a field memory which is used for only an image and for which the reading and writing operations can be executed at a high speed although it is expensive, or a general dynamic random access memory (what is called a DRAM) whose using method is limited although it is cheap.

In the image memory device using the general DRAM, for instance, in the case of processing a digital video signal of eight bits in the depth direction, hitherto, two 1M-bit DRAMs are connected in parallel to thereby obtain a depth of eight bits and two sets of such DRAM pairs are prepared, thereby forming memory devices $M_1$ and $M_2$ to store (512×512) 8-bit image data. For the luminance data of two pixels, color difference data (R-Y) of one pixel is assigned or color difference data (B-Y) of one pixel is assigned. In one whole field, the signals are sampled so that the number of luminance data coincides with the total number of color difference data (R-Y) and (B-Y). The luminance data of the even-number designated fields and the odd-number designated fields are stored into the memory device $M_1$. The color difference data (R-Y) and (B-Y) of the even-number designated fields and the odd-number designated fields are dot-sequentially (or line-sequentially) stored into the memory device $M_2$.

Generally, circuit means called a high speed page mode to read or write data at a high speed is provided for the general DRAM. In such a mode, after a row address has once been set, by merely designating a column address, total 512 data can be sequentially read or written. Therefore, in the conventional apparatus, the number of image data within one horizontal scan period is set to at most 512 and a refreshing operation to hold the data is executed by using a CAS before RAS refreshing cycle for a horizontal blanking period of time.

In the conventional apparatus, since the high speed page mode is limited to 512 pixels, there is a limitation in the number of sampling pixels for one horizontal scan period. However, as the number of horizontal pixels according to the number of vertical pixels, that is, the number of scanning lines, 640 pixels are needed in the case of the NTSC system and 760 pixels are necessary in the case of the PAL system. The number of 512 pixels is merely 67% of that in the case of the PAL system, so that a resolution fairly deteriorates. On the contrary, if it is intended to assure 760 pixels in the horizontal direction, a memory device which can access 1024 (=512×2) data at a high speed must be prepared by increasing the number of memories in the horizontal direction, so that the apparatus becomes very expensive.

SUMMARY OF THE INVENTION

It is an object of the invention to provide an image processing apparatus which can access to a memory at a high speed by using a small capacity in consideration of the above problems.

Another object of the invention is to provide an image processing apparatus which can access to a memory at a high speed by using an arbitrary number of pixels.

Still another object of the invention is to provide an image storing apparatus which can store a plurality of image data.

According to a preferred embodiment of the invention, there is disclosed a control circuit of a memory device of a random access type for storing first data and second data whose reading/writing cycle time is longer than that of the first data, comprising: a memory circuit for reading/writing a predetermined number of first data into/from each memory block which is obtained by dividing the memory device into at least two or more memory blocks, for reading/writing the second data into/from the other memory blocks, and for supplying address signals for the reading/writing cycle period of time of the second data; and a memory switching circuit for switching and using the memory blocks in order to read/write the first and second data.

Further another object of the invention is to provide an image processing apparatus which is suitable to handle image data adapted to the PAL standard.

The above and other objects and features of the present invention will become apparent from the following detailed description and the appended claims with reference to the accompanying drawings.

BRIEF DESCRIPTION OF THE DRAWINGS

FIG. 5 is a timing chart in the case of providing two quiescent periods.

DETAILED DESCRIPTION OF THE PREFERRED EMBODIMENT

An embodiment of the present invention will be described hereinbelow with reference to the drawings.

Figure 1:
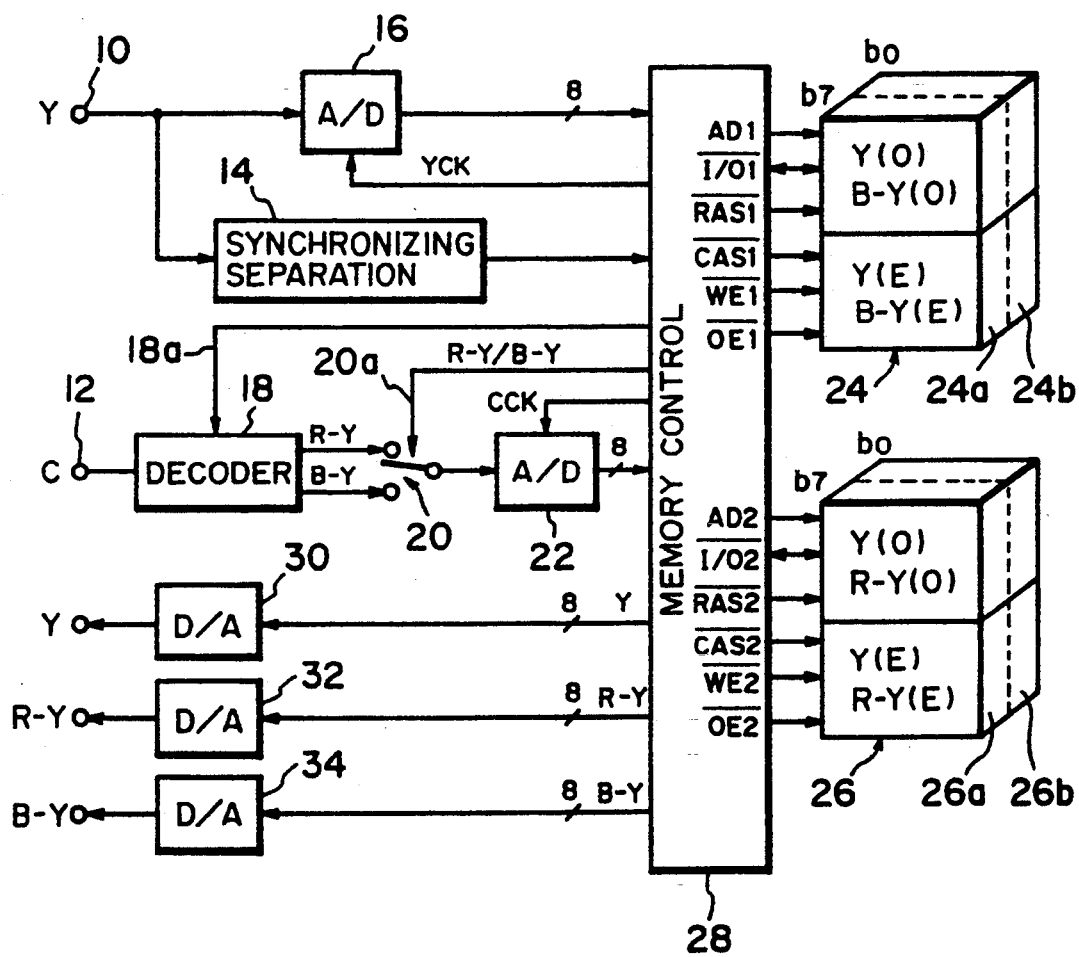
FIG. 1 is a block diagram showing a circuit construction of an embodiment of the invention.

FIG. 1 shows a block diagram of a circuit construction of the embodiment. Reference numeral 10 denotes an input terminal of an analog luminance signal; 12 an input terminal of an analog chrominance signal; 14 a synchronizing separation circuit to separate a sync signal from the luminance signal which was supplied to the input terminal 10; 16 an A/D converter to convert the analog luminance signal supplied to the input terminal 10 into the 8-bit digital signal; 18 a decoder to form color difference signals (R-Y) and (B-Y) from the chrominance signals which were supplied to the input terminal 12; 20 a switch to select the color difference signals (R-Y) and (B-Y) which are generated from the decoder 18; and 22 an A/D converter to convert the color difference signal which was selected by the switch 20 into the 8-bit digital signal.

Reference numeral 24 denotes a memory device which is constructed by connecting two 1M-bit DRAM devices 24a and 24b in parallel. Reference numeral 26 denotes a memory device which is likewise constructed by connecting two 1M-bit DRAM devices 26a and 26b in parallel. In the embodiment, although the details will be explained hereinlater, each of the memory devices 24 and 26 is divided into the halves. The luminance data Y(0) and the color difference data R-Y (0) of the odd-number designated fields are stored into the half of the memory device 24. The luminance data Y(E) and the color difference data B-Y (E) of the even-number designated fields are stored into the remaining half. The luminance data Y(0) and the color difference data R-Y (0) of the odd-number designated fields are stored into the half of the memory device 26. The luminance data Y(E) and the color difference data R-Y (E) of the even-number designated fields are stored into the remaining half.

Reference numeral 28 denotes a memory control circuit for controlling the reading and writing operations for the memory devices 24 and 26, for writing the luminance data from the A/D converter 16 and the color difference data (R-Y) and (B-Y) from the A/D converter 22 into the memory devices 24 and 26, and for reading the data from the memory devices 24 and 26. In accordance with an output of the synchronizing separation circuit 14, the memory control circuit 28 forms sampling clocks YCK and CCK for the A/D converters 16 and 22 and supplies a clock 18a which was formed from a subcarrier to the decoder 18 and supplies a switch control signal to select either one of the color difference signals (R-Y) and (B-Y) to the switch 20.

Reference numeral 30 denotes a D/A converter for converting the luminance data which were read out of the memory devices 24 and 26 by the memory control circuit 28 into the analog signals; 32 indicates a D/A converter for similarly converting the color difference data (B-Y) which was read out of the memory device 24 into the analog signal; and 34 represents a D/A converter for likewise converting the color difference data (R-Y) which was read out of the memory device 26 into the analog signal.

On the other hand, address signals $AD_1$ and $AD_2$, row address strobe signals $\overline{RAS_1}$ and $\overline{RAS_2}$, column address strobe signals $\overline{CAS_1}$ and $\overline{CAS_2}$, read/write control signals $\overline{WE_1}$ and $\overline{WE_2}$, and output enable signals $\overline{OE_1}$ and $\overline{OE_2}$ are supplied from the memory control circuit 28 to the memory devices 24 and 26. Data input/output lines $IO_1$ and $IO_2$ are connected between the memory control circuit 28 and the memory devices 24 and 26.

In the embodiment, attention has been paid to the fact that even if the frequency of the color difference signal in the horizontal direction is set to ¼ of that of the luminance signal, a deterioration of the picture quality is not recognized. A ratio of information amount of the luminance signal to information amount of the color difference signals including R-Y and B-Y is set to ½. That is, a sampling clock frequency of the color difference signal is set to ½ of a sampling clock frequency of the luminance signal. Two luminance data and one color difference data R-Y or B-Y are set to a memory access unit. In the case where the luminance data and the color difference data are read out from or written into the memory devices 24 and 26 at the same timing, a quiescent period corresponding to one clock of the sampling clock of the luminance signal occurs in one of the memory devices 24 and 26 from/into which the color difference data is read out or written in accordance with such a difference between the data amounts. In the embodiment, row addresses can be set into the memory devices 24 and 26 as necessary for the quiescent period. That is, in the embodiment, the quiescent period corresponding to one clock exists every four clocks of the sampling clock of the luminance signal in each of the memory devices 24 and 26. Therefore, an arbitrary number of pixel data can be read or written without a limitation such as 512 pixels as in the conventional apparatus by setting the row addresses in the quiescent period.

Figure 2:
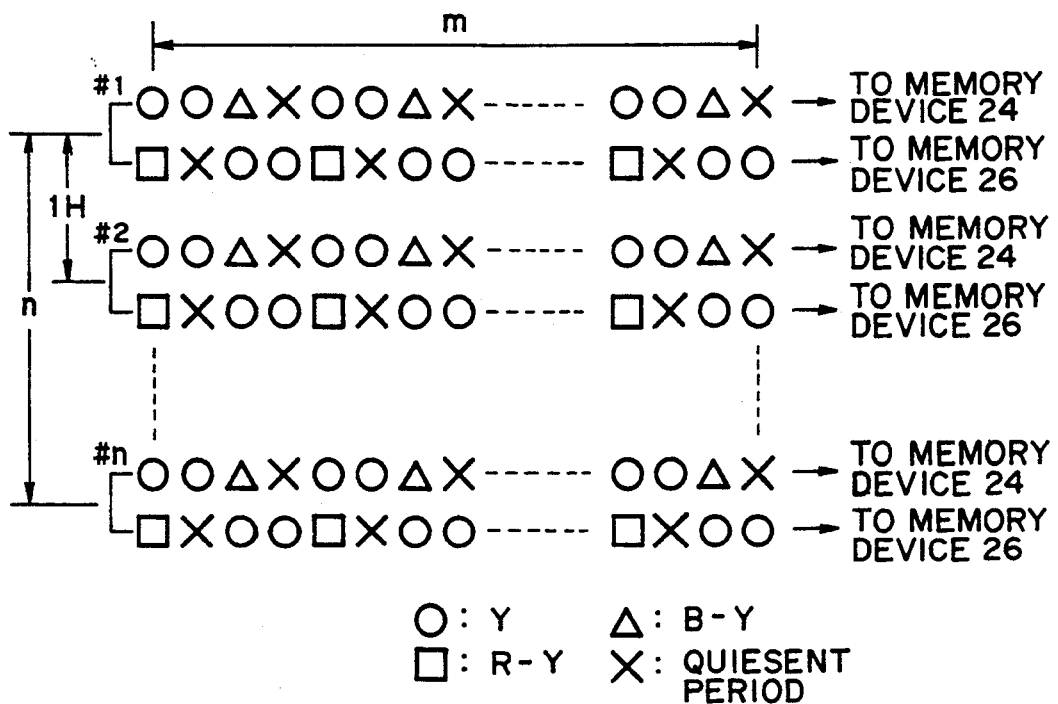
FIG. 2 is an explanatory diagram of the sampling and a memory distribution in the embodiment.

FIG. 2 shows sampling timings of the odd-number designated fields in the embodiment and assigning states of the sampling data into the memory devices 24 and 26. ○ denotes a luminance signal; □ indicates a color difference signal R-Y; △ a color difference signal B-Y; and χ a quiescent period. #1, #2, . . . , #n denote numbers to designate the horizontal scanning lines. In one horizontal scanning line, the luminance signal Y and the color difference signal R-Y are first sampled and the luminance signal Y is stored into the memory device 24 and the color difference signal R-Y is stored into the memory device 26, respectively. After that, only the luminance signal Y is sampled and stored into the memory device 24. Then, the luminance signal Y and the color difference signal B-Y are sampled and stored into the memory devices. After that, only the luminance signal Y is sampled and stored into the memory device 26. That is, the luminance signal Y is alternately stored into the memory devices 24 and 26 every two pixels. Either one of the color difference signals R-Y and B-Y is alternately sampled with respect to two luminance data and the sampled data are alternately stored into the memory devices, i.e., the signal R-Y is stored into the memory device 26 while the signal B-Y is stored into the memory device 24.

As mentioned above, as shown in FIG. 1, the half of the luminance data of the odd-number designated fields is stored into the memory device 24, the remaining half is stored into the memory device 26, the color difference data B-Y is stored into the memory device 24, and the color difference data R-Y is stored into the memory device 26.

Figure 3:
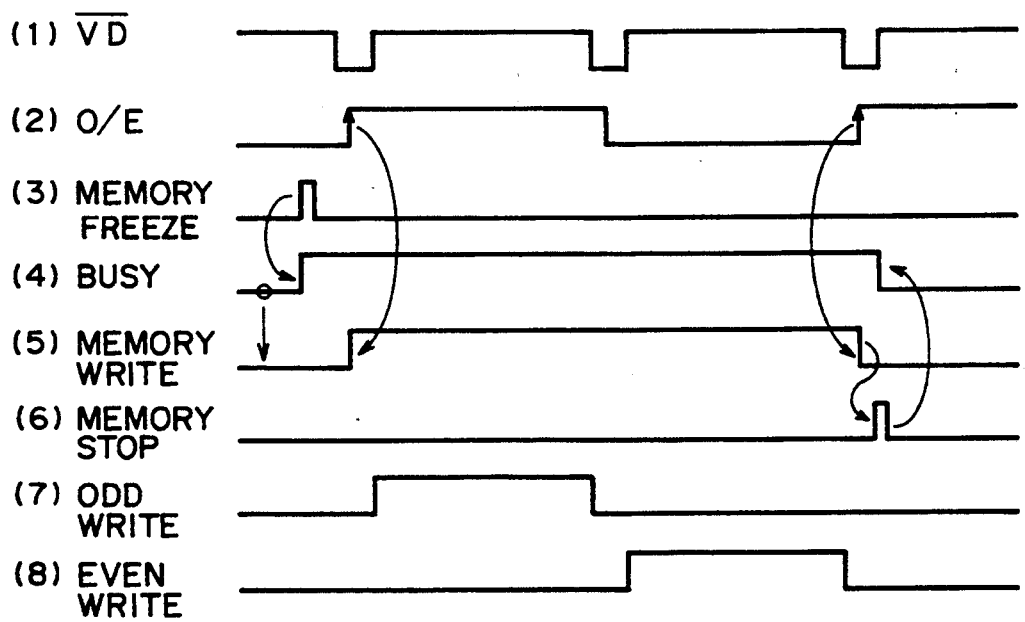
FIG. 3 is a timing chart for a memory phrase.

FIG. 3 shows timings when data is freezed into the memory devices 24 and 26. FIG. 3(1) shows a vertical sync signal $\overline{VD}$ which is set to the low (L) level every field for a short time. FIG. 3 (2) shows a discrimination signal O/E of the odd-field and the even-field. FIG. 3(3) shows a memory freeze signal. FIG. 3(4) shows a busy signal indicating that a freezing operation is being executed. The busy signal is set to the high (H) level in accordance with the memory freeze signal shown in FIG. 3 (3). FIG. 3(5) shows a signal indicating that data is being written into the memory. However, since the T-type flip-flop operation is performed, the signal of FIG. 3 (5) is inverted in response to the leading edge of the field discrimination signal O/E. However, since the memory write signal of FIG. 3(5) has been reset to the L level when the busy signal shown in FIG. 3(4) is at the L level, memory write signal is held to the L level until the busy signal shown in FIG. 3 (4) is set to the H level by the memory freeze signal shown in FIG. 3(3).

FIG. 3(6) shows a memory write stop signal. A pulse of the memory write stop signal is generated when the memory write signal shown in FIG. 3(5) is set to the L level at a memory write stop timing, thereby setting the busy signal shown in FIG. 3(4) to the L level. FIG. 3(7)

shows a timing signal indicative of the writing timing of the odd-field. FIG. 3(8) shows a timing signal indicative of the writing timing of the even-field. And, for example the timing signal shown in FIG. 3(7) is formed by and FIG. 3(8) is formed by the AND of the field discrimination signal O/E shown in FIG. 3(2) and the memory write signal shown in FIG. 3(5).

In the reading operation, the timing signal for reading of the odd-field and the timing signal for reading of the even-field are formed by the AND of the vertical sync signal $\overline{VD}$ and the field discrimination signal O/E.

Figure 4:
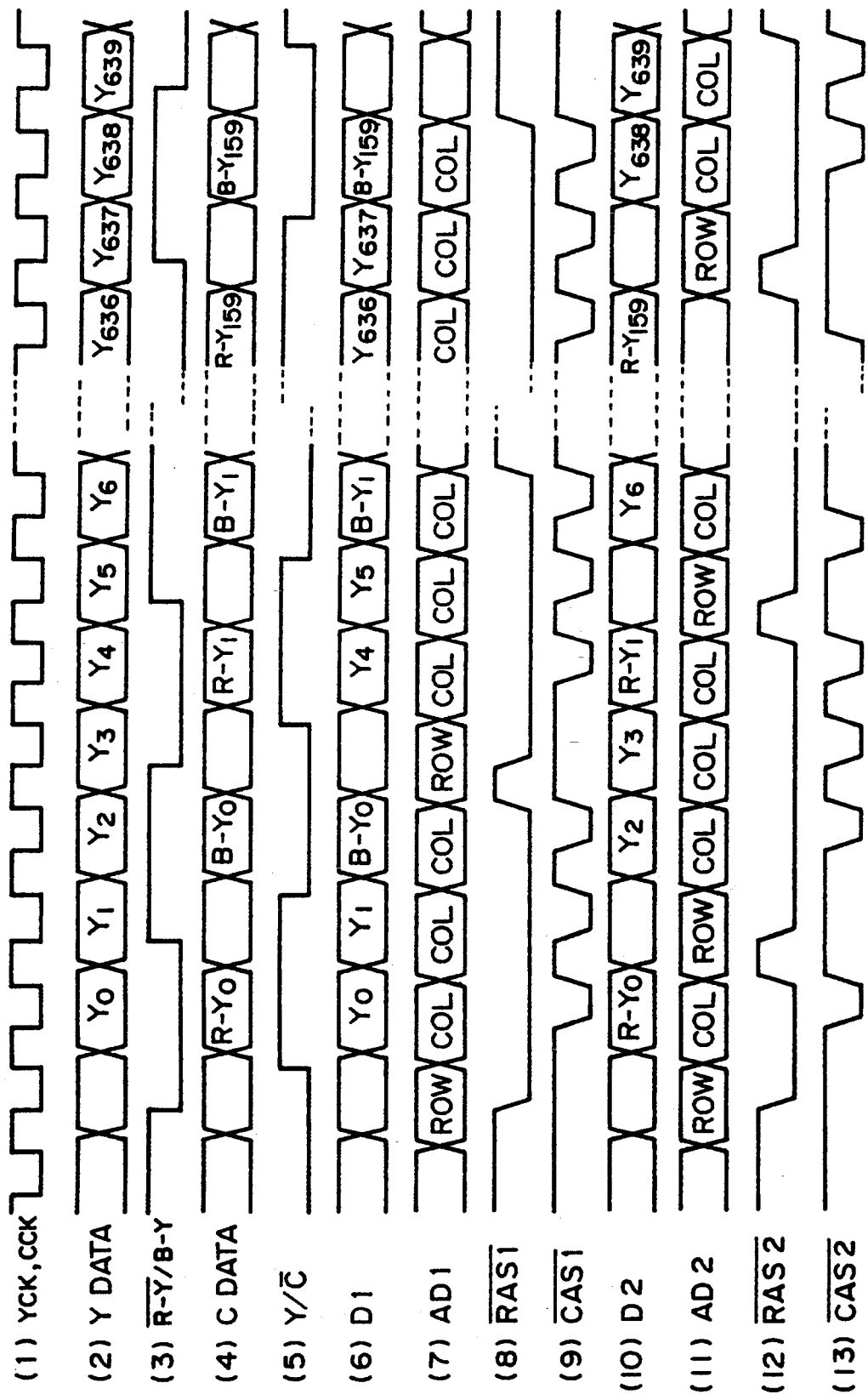
FIG. 4 is a timing chart for a memory write.

The writing operation of the odd-field will now be described with reference to FIG. 4. FIG. 4(1) shows sampling clocks YCK and CCK of the A/D converters 16 and 22. FIG. 4(2) shows output data of the A/D converter 16. FIG. 4(3) shows a control signal 20a of the switch 20. FIG. 4(4) shows output data of the A/D converter 22. FIG. 4(5) shows a control signal to distribute the luminance data Y and the color difference data C(R-Y, B-Y) into the memory devices 24 and 26. When the control signal shown in FIG. 4(5) is set to the H level, the luminance data Y is stored into the memory device 24 and the color difference data R-Y is stored into the memory device 26. When the control signal is set into the L level, the luminance data Y is stored into the memory device 26 and the color difference data B-Y is stored into the memory device 24.

FIG. 4(6) shows data which is supplied to the memory device 24 and only the data (Y, B-Y) which is actually written is shown. FIG. 4(7) shows the address signal $AD_1$ which is supplied to the memory device 24. ROW denotes a row address and COL indicates a column address. Four cycles in which three column addresses COL are arranged after one row address ROW are used as a fundamental unit. FIG. 4(8) shows the row address strobe signal $\overline{RAS_1}$. FIG. 4(9) shows the column address strobe signal $\overline{CAS_1}$. When the signal $\overline{CAS_1}$ is set to the H level, the signal $\overline{RAS_1}$ is set to the L level. Thus, the row address of the address signal $AD_1$ is loaded into a row address register (not shown) of the memory device 24. When the signal $\overline{RAS_1}$ is set to the L level, the signal $\overline{CAS_1}$ is set to the L level. Thus, the column addresses of the address signal $AD_1$ are loaded into a column address register (not shown) of the memory device 24.

FIGS. 4(10) to 4(13) show signals for the memory device 26. FIG. 4(10) shows data $D_2$. FIG. 4(11) shows the address signal $AD_2$. FIG. 4(12) shows the row address strobe signal $\overline{RAS_2}$. FIG. 4(13) shows the column address strobe signal $\overline{CAS_2}$. The timings for the memory device 26 are fundamentally the same as those for the memory device 24.

Since the address control timings in the case of reading out the data which were written in the memory devices 24 and 26 as mentioned above are the same as those shown in FIG. 4, their descriptions are omitted.

If the row address cannot be perfectly supplied for one quiescent period, the luminance data is accessed every three or more pixels and the color difference data is stored into one side and accessed, so that the quiescent period can be extended a long time. For instance, in the case of setting the luminance data of four pixels into one unit, as shown in FIG. 5(1), the color difference data R-Y of one pixel, the color difference data B-Y of one pixel, and two quiescent periods can be distributed. However, if the quiescent period of one clock is insufficient, as shown in FIG. 5(2), the color difference data B-Y is delayed by a time of one clock, thereby allowing two quiescent periods to continue. For this purpose, a latch circuit to latch the color difference signal B-Y is arranged after the A/D converter 22. To return to a state shown in FIG. 5(1) in the reading mode, the luminance data Y and the color difference data R-Y are delayed by a time of one clock. Such a delay time can be realized by merely controlling the reading timing from the memory. The result of the reading operation is shown in FIG. 5(3).

Although the embodiment has been described mainly with respect to the case of setting four cycles of three pixels into one period, it is not always necessary to access the luminance data every two pixels but it is also possible to construct in a manner such that the luminance data is alternately accessed from the memory devices 24 and 26 every predetermined number of pixels of, for example, three or more pixels and, on the other hand, the color difference data is accessed from either one of the memory devices 24 and 26 from which no luminance data is accessed, and the row address is set for an access quiescent period of the color difference data. On the other hand, although the embodiment has been described with respect to an example in which the two memory devices 24 and 26 are used, the invention can be also applied to the case of using three or more individual memory devices.

As will be easily understood from the above description, according to the embodiment, in an image memory apparatus using general random access memories, the limitation in the number of data in the reading or writing operation in the page mode can be eliminated. Thus, the image data process can be executed at a high speed at a desired resolution.

I claim:

1. An image processing apparatus comprising:
   a plurality of memory blocks; and
   control means for making said plurality of memory blocks store first data and second data, an access cycle time of the second data being longer than an access cycle time of the first data,
   wherein said control means accesses a memory block for the second data in a period during which another memory block is accessed for the first data, and sets a row address of the memory block accessed for the first data during a quiescent period of access of the second data, the quiescent period being caused by a difference in the access cycle times of the first and second data.

2. An apparatus according to claim 1, wherein each of said plurality of memory blocks is a dynamic random access memory (RAM).

3. An apparatus according to claim 1, wherein an access cycle of the second data is two times an access cycle of the first data.

4. An apparatus according to claim 1, wherein the first data is luminance data and the second data is color difference data.

5. An apparatus according to claim 1, wherein each of said plurality of memory blocks has a 1M-bit capacity.

6. An apparatus according to claim 1, further comprising supply means for supplying the first and second data.

7. An apparatus according to claim 6, wherein said supply means includes a first analog-to-digital (A/D) converter for the first data and a second analog-to-digital (A/D) converter for the second data.

8. An apparatus according to claim 7, wherein a clock for said first A/D converter is two times a clock for said second A/D converter.

9. An image processing apparatus comprising:
generation means for generating luminance data and color data, a sampling number of the color data being fewer than a sampling number of the luminance data;
a plurality of memory blocks; and
memory control means for accessing, in said plurality of memory blocks, a memory block for the color data in a period during which another memory block is accessed for the luminance data, and for setting a row address of the memory block accessed for the luminance data during a quiescent period of access of the color data, the quiescent period being caused by a difference in the access cycle times of the luminance and color data.

10. An apparatus according to claim 9, wherein said generation means includes an analog-to-digital (A/D) converter.

11. An apparatus according to claim 9, wherein each of said plurality of memory blocks is a dynamic random access memory (RAM).

12. An apparatus according to claim 9, wherein a sampling number of the luminance data is two times a sampling number of the color data.

13. An apparatus according to claim 9, wherein each of said plurality of memory blocks has a 1M-bit capacity.

14. An apparatus according to claim 10, further comprising read means for reading the luminance data and the color data written into said memory block.

15. An image processing apparatus which comprises a memory device of random access type for storing first data and second data, a read/write cycle time of the second data being longer than a read/write cycle time of the first data, said apparatus comprising:
first memory control means for reading/writing a predetermined number of first data from/into each of a plurality of memory blocks which form said memory device, reading/writing the second data from/into a memory block, and supplying a row address signal of the memory block accessed for the first data during a quiescent period of access of the second data, the quiescent period being caused by a difference in the read/write cycle times of the first and second data; and
second memory control means for controlling said memory blocks to read/write the first and second data by selectively switching between memory blocks.

16. An apparatus according to claim 15, wherein the first data is luminance data and the second data is color difference data.

17. An apparatus according to claim 15, wherein an access cycle of the second data is two times an access cycle of the first data.

18. An apparatus according to claim 15, wherein each of said plurality of memory blocks is a dynamic random access memory (RAM).

19. An apparatus according to claim 1, wherein each of the memory blocks are alternately used for reading or writing the first and second data every predetermined period of time.

20. An apparatus according to claim 9, wherein each of the memory blocks are alternately accessed for the color and luminance data every predetermined period of time.

* * * * *